United States Patent [19]

Bahl et al.

[11] 4,347,522

[45] Aug. 31, 1982

[54] LAMINATED METAL CHARGE PLATE

[75] Inventors: Surinder K. Bahl; Walter L. Schutrum, both of Dayton, Ohio

[73] Assignee: The Mead Corporation, Dayton, Ohio

[21] Appl. No.: 249,769

[22] Filed: Apr. 1, 1981

[51] Int. Cl.$^3$ .......... G01D 15/18

[52] U.S. Cl. .......... 346/75; 29/592 R; 29/825; 174/68.5

[58] Field of Search .......... 346/75; 29/592 R, 825; 174/68.5

[56] References Cited

U.S. PATENT DOCUMENTS

| | | | |
|---|---|---|---|
| 3,396,457 | 8/1968 | Nordin | 29/592 R |
| 3,586,907 | 6/1971 | Beam | 346/75 X |
| 3,618,858 | 11/1971 | Culp | 346/75 X |
| 3,975,741 | 8/1976 | Solyst | 346/75 |
| 4,047,184 | 9/1977 | Bassous | 346/75 |
| 4,096,626 | 6/1978 | Olsen | 346/75 X |
| 4,194,211 | 3/1980 | Hoffman | 346/75 |
| 4,222,058 | 9/1980 | Gudorf | 346/75 |
| 4,251,820 | 2/1981 | Humenik | 346/75 |

FOREIGN PATENT DOCUMENTS

| | | |
|---|---|---|
| 52-46724 | 4/1977 | Japan . |
| 55-128473 | 10/1980 | Japan . |
| 55-129472 | 10/1980 | Japan . |

OTHER PUBLICATIONS

Vedder, James L., Charge Plate-Etched Metal Ink Jet Printer Research Disclosure, Jan. 1978, p. 10.

*Primary Examiner*—Joseph W. Hartary

*Attorney, Agent, or Firm*—Biebel, French & Nauman

[57] ABSTRACT

A charge plate for an ink jet printer is fabricated from laminations etched from a thin sheet of corrosive resistant metal. The individual charge electrodes with their respective leads and connecting regions are initially supported in the thin sheet by etched supporting members. Except for the supporting members, the individual charge electrodes with their leads and contact regions are electrically and physically isolated from each other. The lamination sheets are coated with an adhesive, stacked, and bonded together. After filling the open regions in the bonded lamination stack with a structural insulating material, the etched metal supporting members are removed, providing a unitary charge plate that is rugged, dimensionally accurate, and stable.

14 Claims, 13 Drawing Figures

LAMINATED METAL CHARGE PLATE

BACKGROUND OF THE INVENTION

The field of the invention is in the ink jet printing art, and more particularly in that of charge plates having individual jet charging electrodes for ink jet printing heads such as the general type described in Beam et al. U.S. Pat. No. 3,586,907. Coating heads of that type are used in ink jet printing systems, which create printed matter by selective charging, deflecting, and catching of drops produced by the stimulation of one or more rows of continuous flowing ink jets. The jets themselves are produced by forcing ink under pressure through a series of orifices in an orifice plate, which is one component of the coating head.

A stimulation arrangement stimulates the jets to break the jets up into uniformly sized and regularly spaced drops, with drop formation occuring in all jets at more or less fixed positions, all located approximately the same distance from the orifice plate. The charge plate is positioned within the coating head so as to achieve electrical charging of selected ones of the drops being generated A charge plate as taught in the Beam et al. patent comprises a plate of dielectric material provided with a series of charging tunnels located equidistantly along a straight line. Each charging tunnel is coated with an electrically conductive material so as to define a cylindrical charging electrode. Electrical leads are connected to each such charge electrode, and the electrical leads in turn are activated selectively by an appropriate data processing system. Typical prior art charge plates including such electrodes are disclosed in Solyst U.S. Pat. No. 3,975,741; in Kuhn U.S. Pat. No. 3,984,843; and in Bassous et al. U.S. Pat. No. 4,047,184. The prior art also includes charge plates having charging electrodes formed in notches along the edges of the plate as disclosed in the above-mentioned Solyst patent, and also in Culp U.S. Pat. No. 3,618,858.

The charging electrodes whether they be tunnels, slots, or flat faces all present very difficult fabrication problems because of the many requirements imposed upon them. The charging electrodes are quite small (typical tunnel-type electrodes have a 0.012 inch hole diameter). To provide the desired interchangeability of charging plates, the charge electrodes must be accurately positioned not only with respect to each other but also with respect to the confines of the entire charge plate. The desired printing or coating characteristics demanded of this system require that the charging electrodes is located extremely close together. Another requirement of the charging electrodes, as used in the ink jet system, is that they have a relatively high length to cross section ratio. In addition to the foregoing requirements the charge plates must have a high degree of dimensional stability, be rugged and resistant to the ink or coating fluid used in the printing or coating system in which they are placed. Electrically, the charging electrodes must be well insulated from each other with typical values of insulation resistance being greater than $10^{10}$ ohms. Provision must be available for conveniently making electrical contact with the charging electrodes. The resistance from the contact region throughout the electrode surface should not be greater than a couple of ohms.

Many attempts in the prior art have been made to provide a charging plate that will meet the foregoing desired requirements. Drilling of the tunnels in printed circuit boards and machinable ceramics is extremely expensive in materials having sufficient rigidity. Casting of charge plates has not been satisfactory due to the poor dimensional stability of known suitable casting materials for this application. Laser drilling of various suitable substrates has also been attempted. Generally, all the foregoing prior art charging plates have had the problems of the charging electrodes having holes or surfces that were rough, dimensional accuracy varied more than desirable, and the holes were either excessively bell-shaped or tapered. Metalization of the circuit and making satisfactory electrical connections has been difficult. To provide the desired physical resistance to the corrosiveness of the ink coating fluid, a covering material was frequently required. In addition, the prior art charge plates have been relatively fragile, too fragile for ease of handling during changing and cleaning.

Another attempt in the prior art to provide a suitable charge plate is shown in the disclosure by James L. Vedder in the publication "Research Disclosure" for January 1978 at Page 10; published by Industrial Opportunities Ltd., Homewell, Havant, Hampshire, P091EF, U.K. His charge plate is etched from solid metal sheet. Providing suitable charge tunnels in materials having the required thickness for proper operation of the systems of the type herein considered generally has not been completely satisfactory.

Generally, the most satisfactory charge plate of the non-laminated type thus far used for such purposes has been photofabricated from a photosensitive ceramic material which is exposed, etched, and thereafter fired to a final state. It has been found that the firing process causes dimensional alteration of the plate so that the yield of the plates is poor. Those plates which do pass inspection are in many cases marginally acceptable, and they are in any event quite delicate and easily damaged. These plates require the formation of charge tunnels using photolithography and thin film techniques. The circuitry formed is labor intensive and the corrosion resistance of these leads is poor.

Laminated charge plates are well known. Typical prior art laminated charge plates are illustrated by the previously mentioned Solyst in U.S. Pat. No. 3,975,741 and further by Olsen et al. in U.S. Pat. No. 4,096,626 and Paranjpe et al. in U.S. Pat. No. 4,223,320. All of the known prior art laminated charge plates are composed of laminations of dielectric materials. Generally, these charge plates have the previously mentioned problems of dimensional accuracy, dimensional stability, and difficulty of making a satisfactory electrical circuit.

Japanese patent application No. 1222214/1975, patent laid open No. 46724/1977 entitled "Method of Preparing Printing Conductor in Electronic Printer" is of interest in that it teaches the formation of printed circuitry by etching a thin sheet of metal to provide conductors having lead lines and connecting regions. The lamination of conductors is not involved nor is a charge plate for ink jet printers suggested.

SUMMARY OF THE INVENTION

The invention provides a novel charge plate structure, and the method of fabrication, for an ink jet drop printer. The charge plate has high dimensional accuracy and stability, it is resistant to conventional ink fluids, it has good electrical characteristics, is rugged, has a long life, and it is relatively easy and economical to fabricate. The structure is made by etching a plurality of metal laminations, each lamination containing a horizontal section of a charge plate. In a lamination, the charge electrodes with their leads and contact regions are physically supported and held in place by etched supporting structures, frequently referred to as bridges and carriers. The laminations are stacked and with an adhesive bonded together vertically to provide a plurality of charge electrodes each with a lead and contact region. Except for the contiguous supporting structures, the charge electrodes with their leads and contact regions are physically and electrically isolated from each other by openings in the laminations. These openings are filled with a suitable casting resin. The shorting metal supporting structure adjoining the electrodes and leads is removed, and a unitary rugged, rigid, dimensionally accurate, dimensionally stable, corrosion resistant, charge plate having extremely good electrical characteristics is provided.

It is therefore seen as the primary object of this invention to provide a new and improved type of charge plate together with a novel method of manufacture.

DESCRIPTION OF THE PREFERRED EMBODIMENTS

Figure 1:
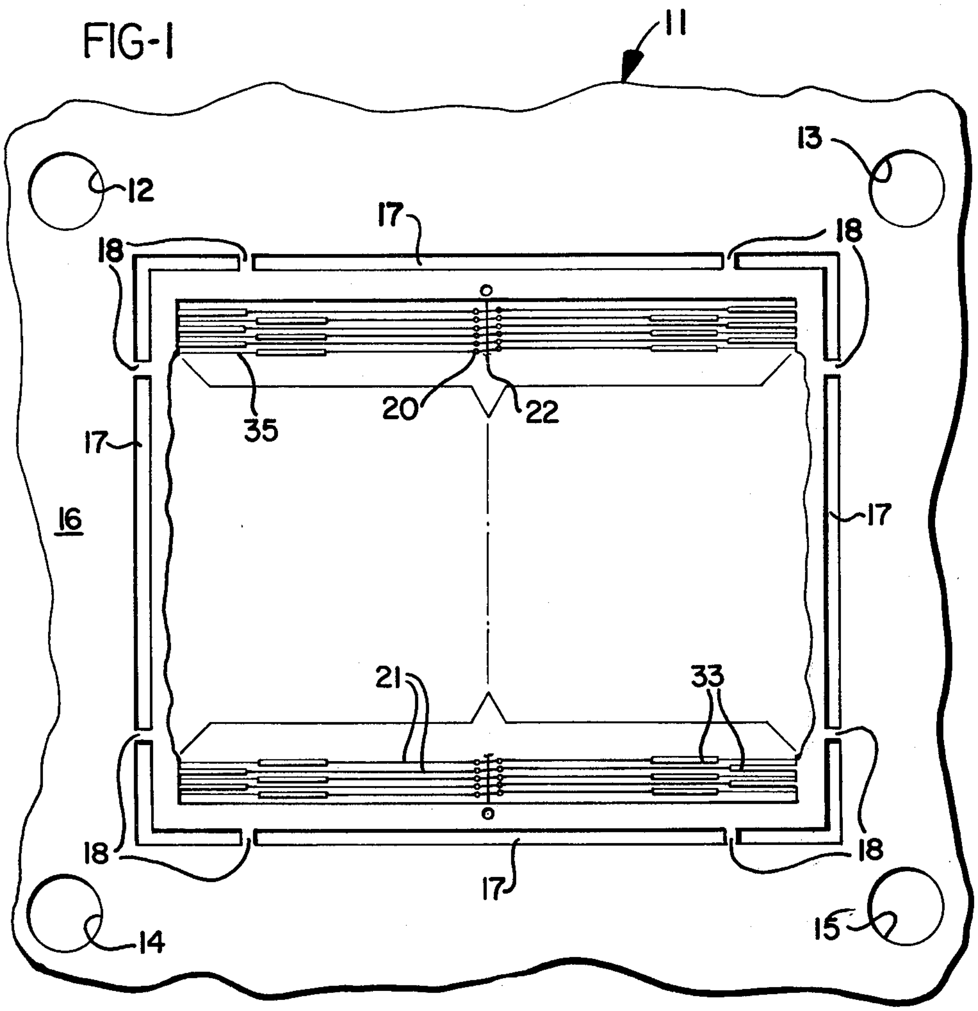
FIG. 1 is a schematic-pictorial view of a typical lamination for a charge plate.

The invention will be described and illustrated in detail in connection with an embodiment of a particular charge plate, i.e., a charge plate having the following typical requirements so as to be compatible with the other components of a typical conventional printing head. The charge electrodes in this particular embodiment are charge tunnels having a diameter of approximately 0.012 inch and a length of 0.046 to 0.047 inches. They are arranged in two rows separated by approximately 0.0583 inch. The spacing between holes within each row is approximately 0.01667 inch. One row is offset from the other by approximately 0.00833 inch. This provides a lateral coverage of 120 per inch. The accuracy of the electrode center to center separation in charge plates is very important for the alignment of the charge plate with the orifice plate. This invention provides an accuracy heretofore unobtainable in that once the photolithographic process is established to provide the desired dimensions, there will be no accumulated errors in dimensions per length and all the etched pieces will have the same linear accuracy, repeatably. The foregoing stated dimensions are typical requirements of a typical printing head and are not requirements of the invention. The invention is equally well suited to other dimensions of charge tunnels and other types of charge electrodes as will be shown later. In this particular embodiment being described in detail, the metal sheet from which the laminations are obtained is two mil (0.002 inch) type No. 316 stainless steel, generally the preferred material. Other metals such as copper and nickel may be used although stainless steel is preferred due to its superior corrosion resistance. Again, the corrosion resistant characteristic is not a requirement of the invention but a typical requirement imposed by the conventional environment in which the invention is at the present state of the art typically placed. For example, conventional iron or steel laminations would be suitable for use with a non-corrosive ink. The prior art devices generally have circuits and charge tunnels consisting of thin metal either vacuum deposited, electrolessly deposited, or electrolitically deposited onto a dielectric (insulating) substrate. The thickness of the deposits is generally of the order of 0.04 mil to 2.0 mil. These "thin" circuits are quite susceptible to shorting and if they are not coated and protected, they are deplated by errosion within a few milliseconds of operation. The laminated structure of the invention comprises many approximately 0.002 inch thick elements stacked to a conventional thickness which provides a structure having hundreds of times more corrosion resistance than the conventional prior art devices. Approximately 2 mil thick sheets are generally the preferred lamination material thickness, the thickness is not critical. With thicker material, more taper across the thickness of the lamination will occur in the etching process and this will make it difficult to define metal rings around the holes. The holes will have a tendency to be interconnected. Thinner materials, on the other hand will require a larger number of laminations to achieve the desired thickness.

Considering the foregoing requirements, FIG. 1 schematically illustrates a typical etched 2 mil stainless steel lamination. It is conventionally etched from stainless steel stock by using a conventional appropriate photoresist mask and spraying with ferric chloride, kept at approximately 160° F. Undercutting is reduced by etching simultaneously from two opposite sides. The part is periodically inspected and etching is stopped when the required shape is achieved.

Figure 2:
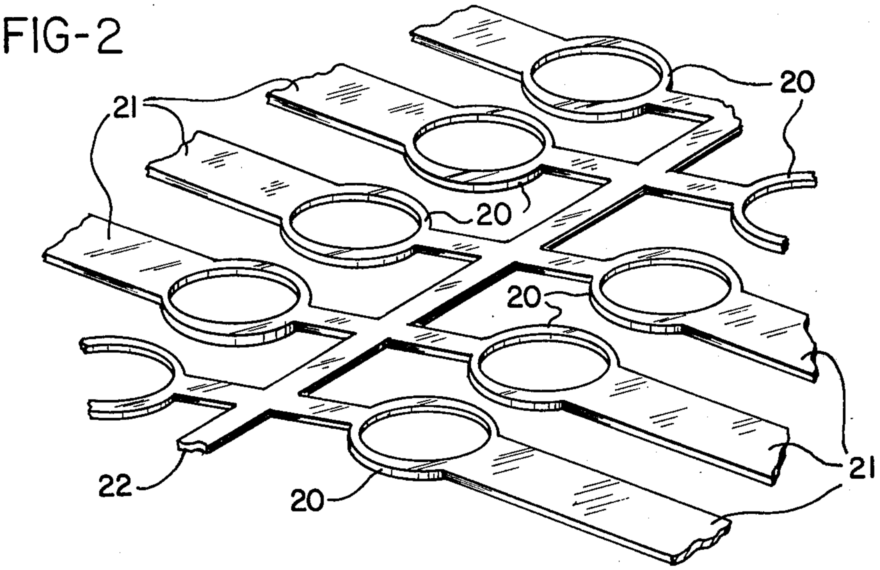
FIG. 2 is an enlarged schematic-pictorial perspective view of a section of a lamination illustrating typical bridging between charge electrode segments.
Figure 3:
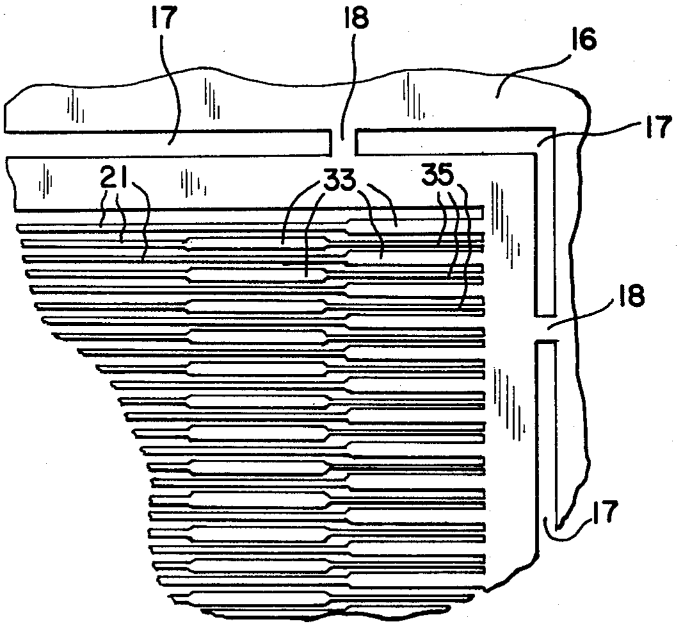
FIG. 3 is an enlarged schematic-pictorial view illustrating typical contact area and lead arrangement associated with each charging electrode segment.

FIG. 2 is an enlarged view of typical charge electrode segments 20, lead segments 21 and supporting structure 22, frequently termed "bridging," of a lamination. FIG. 3 is an enlarged view showing typical contact region segments 33 of a lamination as previously illustrated in FIGS. 1 and 2.

Figure 4:
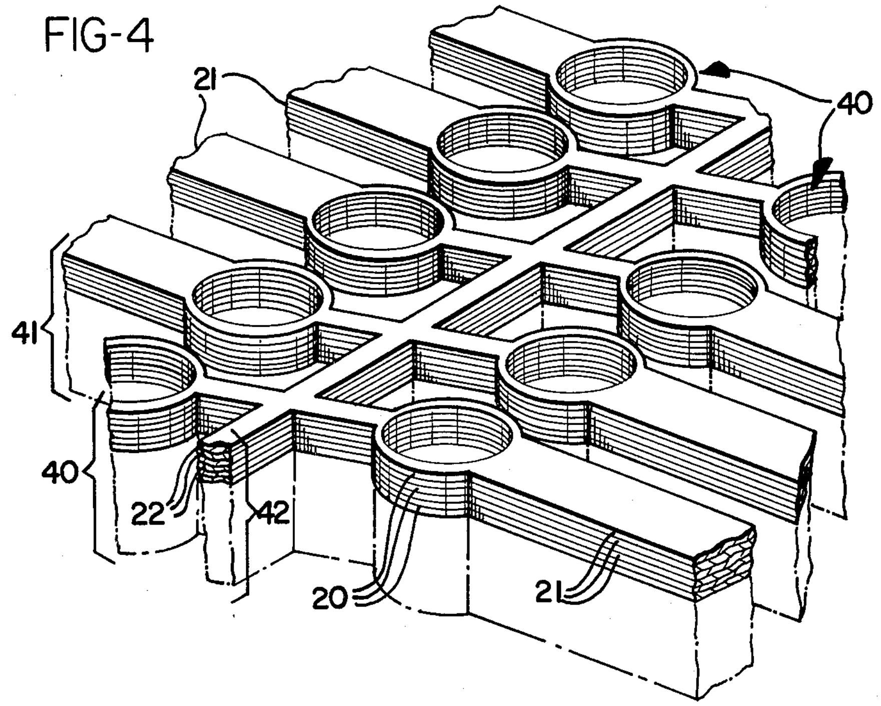
FIG. 4 is an enlarged schematic-pictorial perspective view illustrating a stack of laminations showing the alignment of the charge electrode and lead segments.

The etched laminations 11 (FIG. 1) are conventionally cleaned to provide a dry, grease-free surface. The number of laminations to provide the stack thickness desired are then preferably coated with a B-stage adhesive (for ease in handling) and conventionally bonded together to provide a unitary structure. A suitable bonding agent is 3M SCOTCH-WELD structural adhesive No. 2290. It is generally applied to one side only of each lamination. Only one lamination side of adjacent sides (as placed in the stack) need be coated. The laminations are air-dried at approximately 200° F. for 30 minutes or 300° F. for approximately 5 minutes. The laminations 11 are then stacked and aligned by placing over dowel pins in guide holes 12–15. The stack is cured at a temperature of approximately 330°–375° F. and a pressure of approximately 5,000 psi for approximately 60 minutes. Other suitable bonding adhesives are B. F. Goodrich No. 729-3. Stacking can also be achieved by using conductive epoxies such as Emerson and Cuming conductive silver epoxies Nos. 56, 57, and 59. The unitary structure now has the appearance in the vicinity of the charge electrodes 40 as illustrated in FIG. 4. Typically, 20 nominal 2-mil laminations bonded together provide a stack approximately 0.043 to 0.047 inches in thickness.

Figure 5:
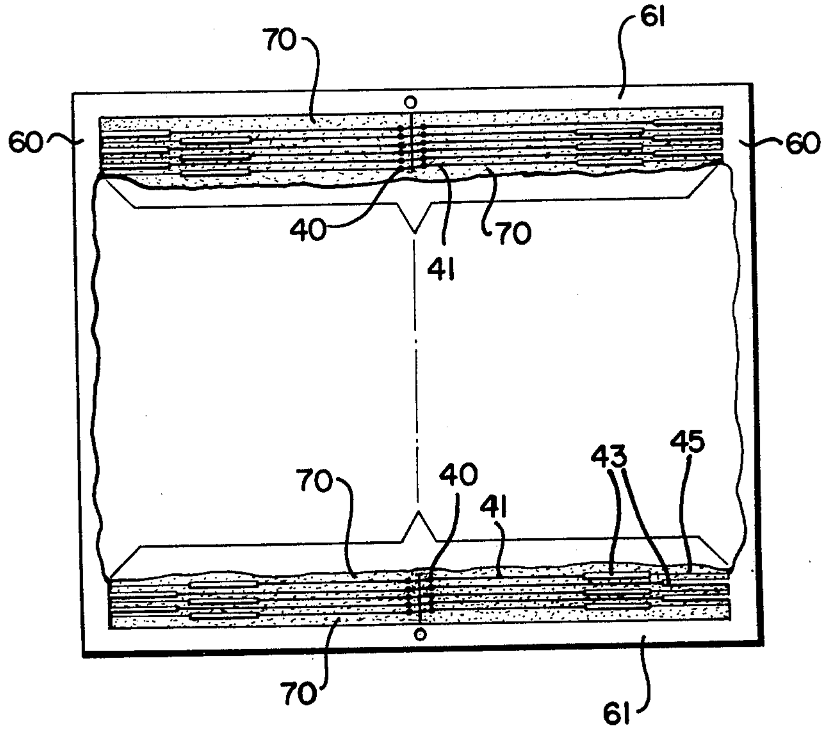
FIG. 5 is a schematic-pictorial view illustrating an encapsulated lamination stack.

The excess metal 16 around the desired lamination structure is removed at opening 17 by cutting through supporting bridges 18 (FIG. 1) providing a stack having the outline as illustrated in FIG. 5. The stack should be substantially flat and free of foreign particles, particularly free of metal (conductive) particles. It is desired to fill all the openings in the lamination stack, (except the charge tunnels), with a stable, supportive casting resin 70. It is preferred not to get the casting material inside the charge tunnels, this will preclude having to later drill them out. It is also preferred to keep the casting material off the contact regions 43 (128 in number) so that electrical connections may easily be made to them. Masking is the generally preferred way to do this. Typically, one side (the bottom) of the stack is completely masked with a conventional suitable masking material such as a layer of 3-mil KAPTON tape, and for the embodiment being described, two 1-mil polimide (KAPTON) tape strips 2¾ to 3 inches long by 20 mils wide are cut and placed one over each row of tunnel charge electrode holes on the other (top) side. It has been found that to get good adhesion of the masking tape without stretching, that the placing of a piece of pad paper over the tape and using light thumb pressure to press and rub the back of the paper will provide intimate contact of the masking tape strip with the tops of the holes. If it is desired to later make elecrtrical contact with both top and bottom sides of the charge plate, the area over the contact region on the top side of the lamination stack is also masked.

The casting resin used to fill the openings in the lamination stack should have a relatively low viscosity, exhibit little shrinkage upon curing, be relatively strong and physically stable. One casting region which has been found suitable is an epoxy resin comprising Bisphenol A and Epichlorohydrin, which is sold by Emerson and Cuming, Inc. of Northbrook, Ill., under the name STYCAST 2057. This resin is mixed by weight in a ratio of about 100 parts STYCAST 2057 resin with 6 to 7 parts of a modified aliphatic amine catalyst such as identified by Emerson and Cuming, Inc. as Catalyst 9. Prior to the casting step, the resin and catalyst mixture is placed in a vacuum chamber for evacuation of all air. After filling the openings in the stack, it is placed in a vacuum chamber at about 29 inches of mercury vacuum for about 3 minutes. Any excess epoxy on the top laminations or tape strips is scraped away, the 2 20-mil tape strips are carefully removed, maintaining the stacks substantially level, and the epoxy encapsulated stack placed level in a convection oven set at 110°–120° F. for approximately 3–4 hours. The epoxy filled stack is removed from the oven and allowered to further cure for approximately 18–20 hours.

Figure 6:
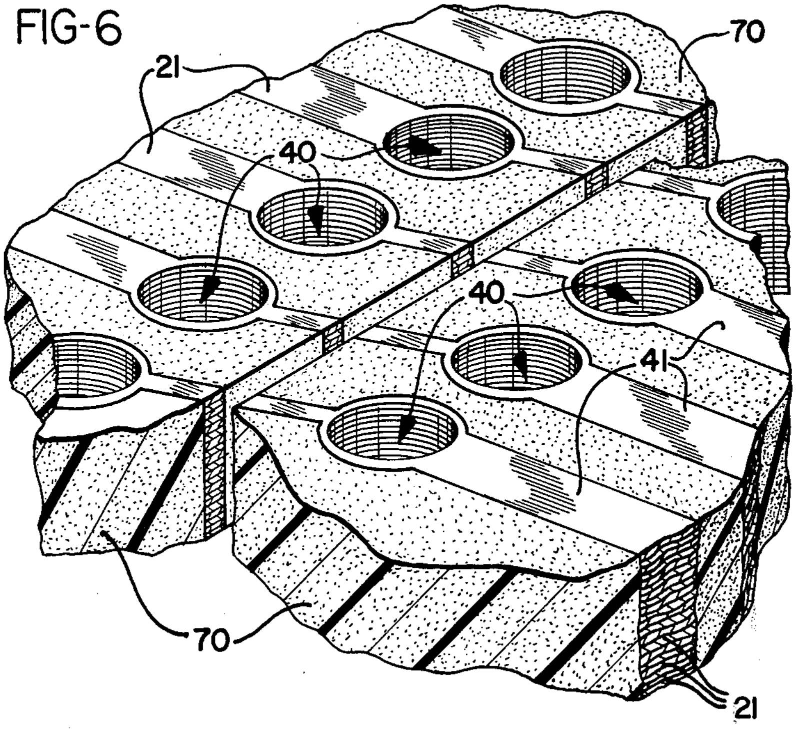
FIG. 6 is a schematic-pictorial view illustrating typical removal of bridging between electrodes.

After the epoxy has cured, the metal supporting member 42 (FIG. 4) is removed. This bridging metal supporting structure if not removed would electrically short the charging electrodes. It is conventionally removed by using electric discharge machining or wire sawing. The removal of the 7-mil bridge section by EDM is achieved by using a 5-mil thick and 1.065 inch wide carbon electrode. It is desirable to protect the top and bottom laminations with thin pieces of stainless steel to prevent arcing damage at entry and exit of the carbon electrode. Wire sawing is achieved by using a wire impregnated with fine diamond particles. The wire cut yields parts with minimum kerf loss and virtually no breakout or surface damage. FIG. 6 pictorially illustrates the appearance of the region around the charge tunnels 40 with the bridging removed.

The charge rings are electrically isolated from each other by removing the shorting carrier side supporting member 60 (FIG. 5). The entire sides 60 of the carrier are removed by grinding and/or lapping so that all 64 contacts on each side are electrically isolated. Carrier end support members 61 are left in place for strength. They are electrically isolated and nonshorting.

The 128 individual charging electrodes are now each electrically isolated and may be conventionally tested for shorts or leakage between them. With good units, the insulation resistance between individual charging electrode members is so high that it is difficult to measure. The individual charging members may also be tested for conductivity from the top lamination to the bottom lamination. Typically, the resistance between the top layer and the bottom layer will not exceed 1/10 ohm, even though the layers are bonded together by a non-conductive adhesive material.

The foregoing electrical tests are not a requirement in the fabrication steps in the method of producing charge plates herein disclosed. Economically, the electrical testing is practical to preclude doing further work on a defective plate.

Figure 7:
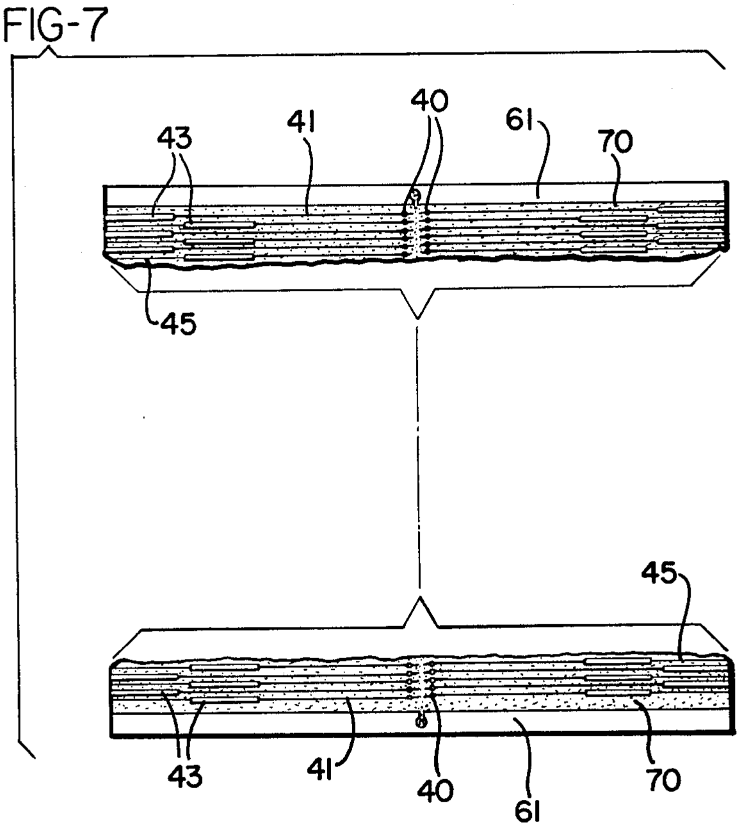
FIG. 7 is a schematic-pictorial view of a completed charge plate.

After the central bridging structure is removed (and the stack satisfactorily electrically tested, if desired), the open area created by the bridge removal and all other areas between the electrodes not presently filled with epoxy are filled and cured as before. The finished charge plate now has the appearance illustrated in FIG. 7.

Figure 8:
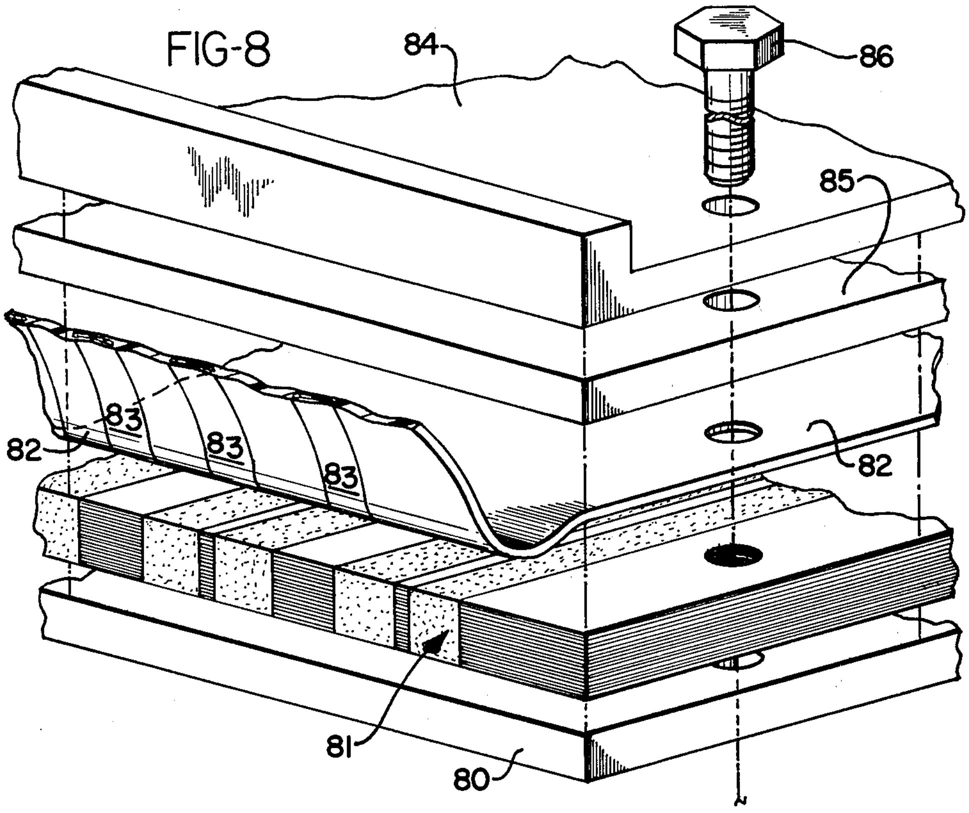
FIG. 8 is a schematic-pictorial view illustrating an attachment of a typical pressure connection to a charge plate.

Electrical contacts with contact regions of a charge plate are typically made by pressure contacts, i.e., external conductors are pressed against the contact regions under sufficient pressure to assure good electrical connection, or wires or ribbon-type leads may be soldered to the contact regions of the charge plate. FIG. 8 illustrates schematically a suitable clamping arrangement to provide pressure contact with one side of the charge plate. A lower insulated backing plate 80 is placed below the laminated charge plate 81. The conventional flexible circuit strip 82, with conductors 83 bared appropriately to match the contacting regions of the charge plate, is uniformly clamped against the contacting regions of the charge plate by upper clamp member 84 pressing through silicon elastomer member 85 as machine screws 86 are tightened.

Figure 13:
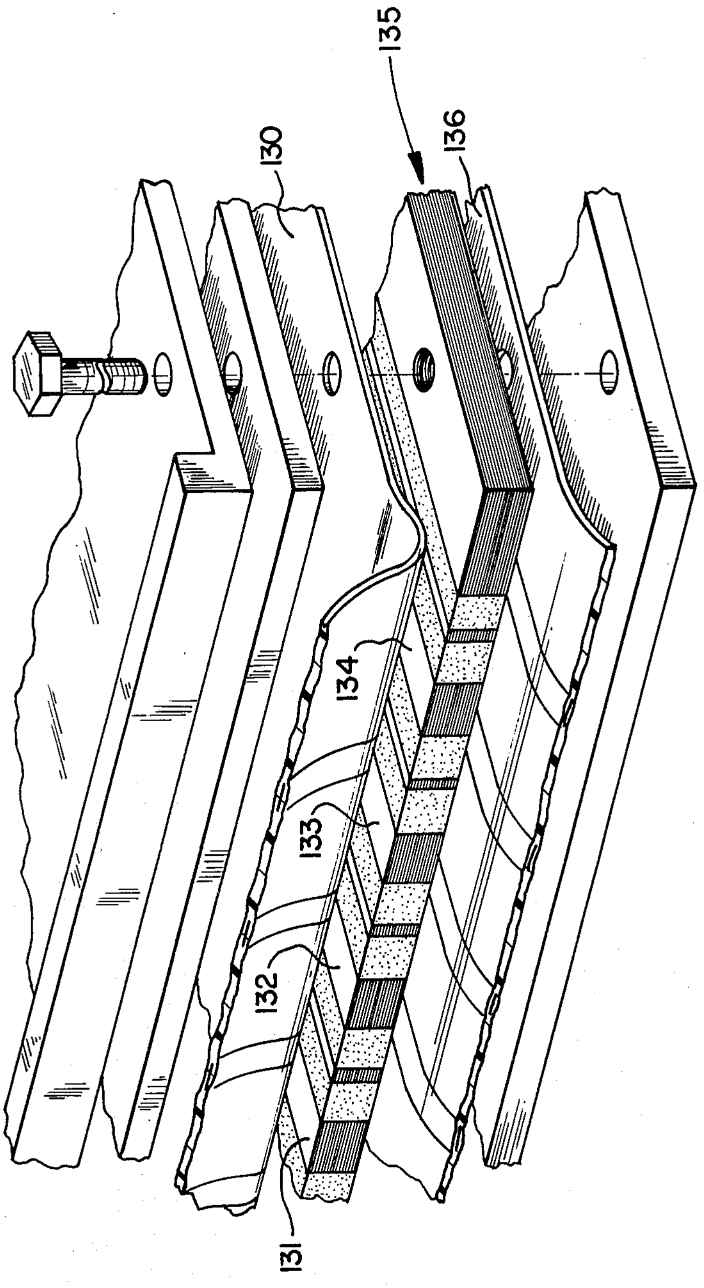
FIG. 13 is a schematic-pictorial view illustrating pressure connections to both sides of a charge plate.

Since the contact regions are contiguous from the top side of the lamination stack to the bottom side of the stack contact may be made from either or both the top and the bottom of the lamination stack to any of the 64 contacts on the right or left side of the charge plate. Frequently, it is desirable to make contact with one row of contacts from the top of the charge plate and with the other row from the bottom side of the charge plate. This is schematically illustrated in FIG. 13. Upper flexible strip 130 contacts the outer row of contacts 131–134 on the top side (partially illustrated) of laminated charge plate 135, and lower flex strip 136 contacts on the bottom of the charge plate the inner row of contacts (not illustrated). That is, in the particular embodiment being described in detail having 128 charge tunnels, 64 contacts are on the left side of the two rows of charge tunnels and 64 contacts are on the right side of the rows of charge tunnels. Flexible strip 130 connects with 32 contacts and flexible strip 136 connects with 32 contacts.

It is frequently desired to solder electrical connections to the contact regions of a charge plate as previously mentioned. Bare stainless steel presents somewhat of a problem from a soldering standpoint. Thus, in embodiments fabricated from stainless steel laminations, it is desirable to nickel plate the top surface of the top lamination, and if connections are to be made to both the top and bottom sides of the charge plate, also to the bottom of the bottom lamination, i.e., both outside surfaces of the lamination stack. (From a practical consideration, it is generally desirable to plate an entire lamination.) The central laminations need not be plated. The nickel surfaces are preferably conventionally solder coated prior to the making of the electrical connection, however, it is not required as the connecting leads may be soldered directly to the nickel surfaces.

Instead of a resin-type adhesive bonding agent between laminations used for stacking, a suitable alternative is conventional solder. In these embodiments, the stainless steel etched laminations are lightly nickel plated, then a thin film of solder is electrolytically deposited over the nickel. A eutectic solder is generally preferred. Under pressures of approximately 5000 psi and temperature above the melting point of the solder, (for substantially eutectic solder such as 60–40, approximately 425° F. is suitable), the laminations are effectively sweated together. The pressure is released when the temperature of the part and the press has cooled below the eutectic point. A structure fabricated in this manner has very good electrical characteristics, provided care is used and the amount of solder is not so great as to cause shorts between electrodes. In these embodiments as in the previously described ones, if necessary, the electrode faces, i.e., the inside surfaces of the charge tunnels in the embodiment being described in detail, may be reamed, drilled, or otherwise cleaned of roughness, bonding agent runs, and foreign material. Of course, solder-coated laminations are ideal for soldering connections to external leads. Care must be used when soldering the external connections so that a minimum of heat transfer takes place so as not to tend to release the solder bond between the laminations. Thus, in making the connection, a short time interval with a high temperature is much to be preferred to a longer time at a temperature slightly above the solder melting point. In this manner, a large temperature gradient exist from the surface of the lamination stack. The surface becomes hot enough to make the connection, and the penetration of the heat is minimal.

Figure 9:
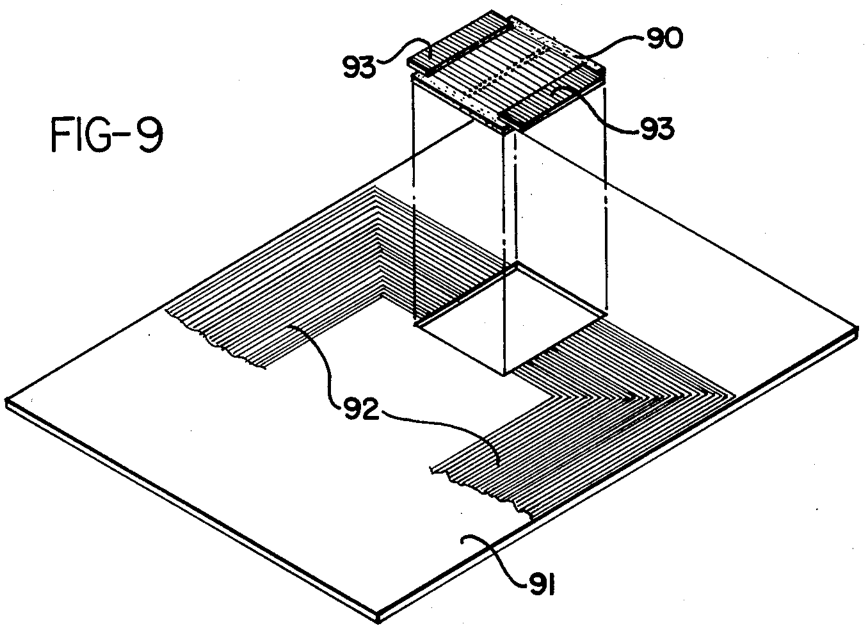
FIG. 9 is a schematic-pictorial view illustrating a typical insertion and connection of a charge plate fabricated according to the invention into a printed circuit board.

In many instances, it may be desirable to insert the charge plate physically and electrically directly into a printed circuit board. FIG. 9 schematically illustrates a charge plate 90 of the type just described in detail ready for insertion into the printed circuit board 91 having printed circuit traces 92. The stainless steel laminated charge plate 90 with the top lamination coated as previously described so as to be readily solderable, has conventional 5-mil KAPTON copper ribbon 93 with 64 leads conventionally soldered to the charge plate. The charge plate will be indexed into position, epoxied in the printed circuit board, and the Kapton ribbon leads soldered to the traces in the circuit board.

Figure 10:
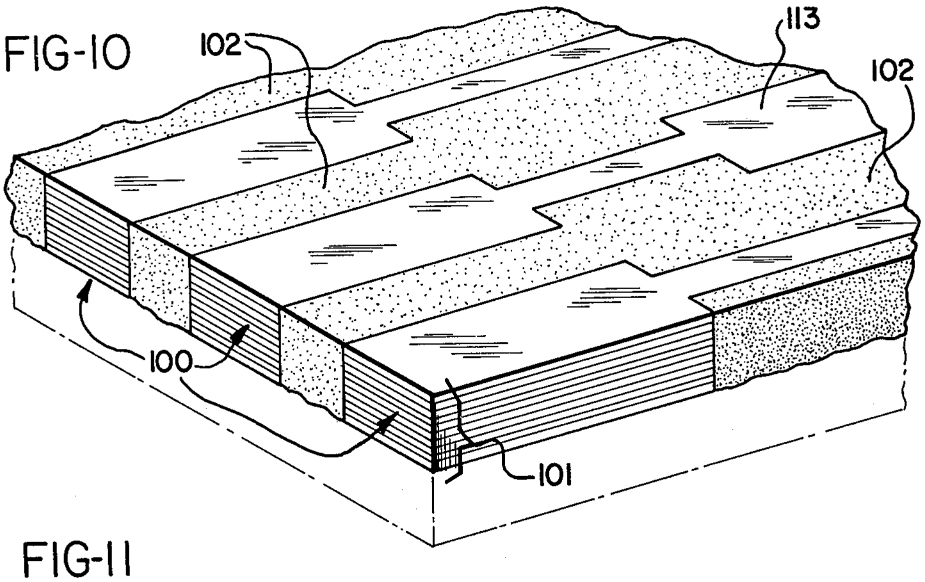
FIG. 10 is a schematic-pictorial view of a flat faced charge plate fabricated according to the invention.
Figure 11:
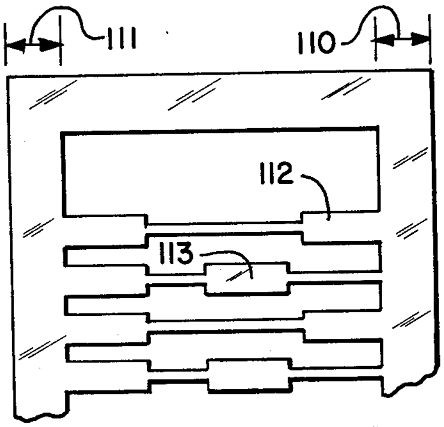
FIG. 11 is a schematic-pictorial view illustrating a typical lamination for the charge plate for FIG. 10.

The invention is not limited to two-row, tunnel-type charge plates, previously described in detail, but is equally suited to single-row tunnel plates and to all known types of charge plates. FIG. 10 schematically illustrates a section of a flat face charge plate. The charging electrodes are the faces 100 across the ends of lamination stacks 101. The laminations 101 are etched, stacked, bonded, and encapsulated with insulating dielectric epoxy 102, as previously described. A suitable lamination configuration for a flat face electrode charging plate is schematically illustrated in FIG. 11. After encapsulation, the supporting carrier members 110 and 111 are removed providing the flat faces illustrated in FIG. 10. Suitable contacting regions as illustrated at 112 and 113 are typical.

Figure 12:
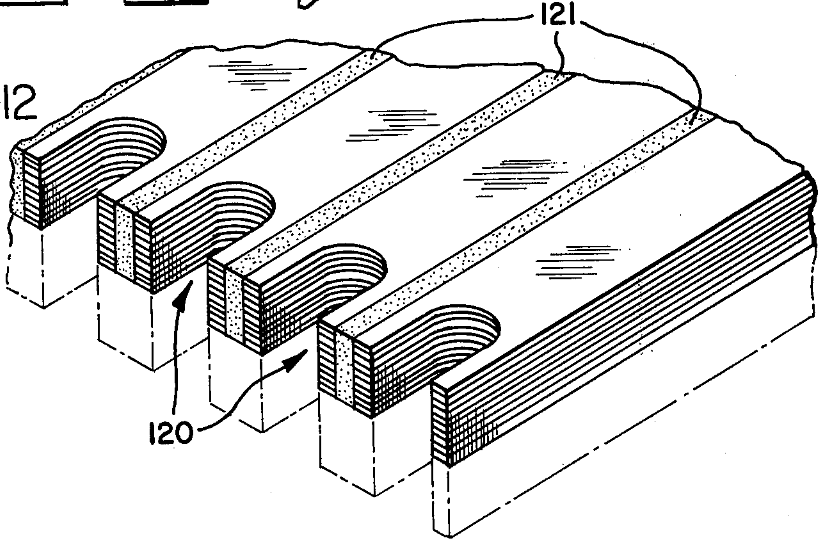
FIG. 12 is a schematic-pictorial view illustrating a slot-type charge plate fabricated according to the invention.

FIG. 12 schematically illustrates a slot-type charging plate fabricated as taught herein. The charging electrodes are the slots 120 in the ends of the laminations. The laminations are held together as previously described and the openings 121 between the electrodes, leads and contact areas are epoxy filled as before.

The present invention has been described and illustrated by reference to particular embodiments so that those desiring to practice the invention may readily grasp the art involved. It is to be understood, however, that those skilled in the art will make changes in the form and details of the invention without departing from the scope of the invention as set forth in the appended claims.

What is claimed is:

1. A charge plate for a jet drop printer, comprising:

a. a plurality of matched laminations of electrically conductive material of readily etchable thickness each lamination comprising a plurality of electrode segments with electrical lead segments attached thereto;

b. means bonding said laminations together in matching alignment to provide a plurality of charge electrodes with attached leads; and c. non-conductive encapsulating material structurally supporting said charge electrodes and said leads.

2. A charge plate according to claim 1 wherein said laminations comprise stainless steel having a thickness in the order of about 0.002 inches.

3. A charge plate according to either of claims 1 or 2 wherein said encapsulating material comprises a cast resin material.

4. The method of fabricating a charge plate for an ink jet printer comprising the steps of:

a. etching electrically conductive sheet metal to define a plurality of matched lamintions, each of said laminations having a corresponding plurality of charge electrode segments with lead segments, and electrode segment and lead segment supporting structure attached thereto;
b. stacking said laminations in matching relationship;
c. bonding said laminations together to form a lamination stack;
d. encapsulating said lamination stack in electrical insulating material; and
e. removing said supporting structure from said laminations.

5. The method of fabricating a charge plate for an ink jet printer comprising:
a. etching sheet metal to provide a plurality of laminations, each of said laminations having a corresponding plurality of openings, both shorting and nonshorting supporting members, and charge electrode segments with each said charge electrode segment havin a lead segment with a contact region segment, said electrode segments and lead segments held in position by said supporting members;
b. applying an adhesive to at least one less than one-half the total number of sides of said plurality of laminations;
c. stacking and aligning in bonding relationship said plurality of laminations;
d. applying heat and pressure for a predetermined period of time to said stacked and aligned laminations bonding them together and providing a lamination stack;
e. masking said charge electrodes and contact regions of said lamination stack;
f. encapsulating said lamination stack in electrical insulating material; and
g. removing said shorting supporting members and masking from said encapsulated lamination stack.

6. The method as claimed in claim 5 wherein said adhesive is a type B-stage adhesive.

7. The method as claimed in claim 6 wherein said etching is an etching from both sides of said sheet of metal.

8. The method of fabricating a charge plate for an ink jet printer comprising:
a. etching sheet metal to provide a plurality of laminations, each of said laminations having a corresponding plurality of etched openings, shorting and nonshorting supporting members, and charging electrode segments with each charge electrode segment havin a lead segment and a contact area segment;
b. applying an adhesive, for bonding into a stack, to said plurality of laminations;
c. stacking and aligning in bonding relationship said plurality of laminations;
d. applying heat and pressure to said stacked and aligned laminations to produce a bonded lamination stack;
e. filling the said openings in the lamination stack with a supporting insulator; and
f. removing said etched shorting supporting members from the said lamination stack.

9. The method as claimed in claim 8 wherein said adhesive is a B-stage structural adhesive.

10. The method as claimed in claim 9 wherein the supportive insulator is an epoxy casting resin.

11. The method as claimed in claim 8 wherein the said etching is etching from both sides of said sheet metal.

12. The method of fabricating a charge plate for an ink jet printer comprising:
a. etching from a thin sheet of corrosion-resistant metal, a first lamination having a plurality of openings, and charge electrode segments with each charge electrode segment having a lead segment and a contact region segment, the said electrode segments and lead segments being supported in the said openings by etched contiguous supporting members;
b. etching from a thin sheet of corrosion-resistant metal a predetermined plurality of laminations substantially identical with said first lamination;
c. applying a solderable coating to one side of said first lamination;
d. applying an adhesive for bonding to said laminations;
e. stacking and aligning in bonding relationship said plurality of laminations with said solderable coated side of said first lamination being an outside surface of said lamination stack;
f. applying heat and pressure to said stacked and aligned laminations to produce a bonded lamination stack;
g. filling said openings in the lamination stack with supportive insulation; and
h. removing said etched contiguous supporting members.

13. The method of fabricating a charge plate for an ink jet printer comprising:
a. etching from a thin sheet of corrosion-resistant metal, a top lamination and a bottom lamination, said laminations having substantially an identical corresponding plurality of openings, bridges, shorting and nonshorting carriers, and charge electrode segments with each said charge elctrode segment having a lead segment and a contact region segment;
b. etching from a thin sheet of corrosion-resistant metal a predetermined plurality of central laminations, said laminations having a plurality of openings, bridges, carriers, and charge electrode segments with each said charge electrode segment having a lead segment and contact area segment and said central laminations being substantially indentical with the said top and bottom laminations;
c. placing a solderable surface on a side of said top lamination and on a side of said bottom lamination;
d. applying an adhesive for bonding said top and bottom laminations and said central laminations into a stack;
e. stacking and aligning in bonding relationship said laminations with said top lamination on the top of said central laminations and said bottom lamination on the bottom of said central laminations with the said solderable surfaces the outside surfaces of the stack;
f. applying heat and pressure to said stacked and aligned laminations to provide a bonded lamination stack;
g. masking said charge electrodes and contact regions of the said lamination stack;
h. encapsulating said lamination stack with supportive insulating material;
i. removing said lamination bridges providing a cutout region;

j. filling said cut-out region with a supportive insulating material;

k. removing said shorting carriers; and l. removing said masking from said charge electrodes and contact areas.

14. The method of fabricating a charge plate for an ink jet printer comprising:

a. etching a sheet of corrosion-resistant metal to provide a plurality of laminations, each having a corresponding plurality of etched openings, shorting supporting members, and charge electrode segments, with each charge electrode segment having a lead segment and contact region segment;

b. coating said plurality of laminations with a solder;

c. stacking in alignment said plurality of laminations;

d. applying heat and pressure to said stack of laminations to bond the laminations together and produce a solder bonded lamination stack;

e. filling the said openings in the lamination stack with a supporting insulator; and f. removing said etched shorting supporting members from said lamination stack.

* * * * *